(12) United States Patent
Abe et al.

(10) Patent No.: US 8,648,484 B2
(45) Date of Patent: Feb. 11, 2014

(54) POWER GENERATING DEVICE AND BRAKING DEVICE

(75) Inventors: Kenji Abe, Toyota (JP); Hiroshi Isono, Mishima (JP); Yoshitomo Denou, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 105 days.

(21) Appl. No.: 13/389,914

(22) PCT Filed: Aug. 11, 2009

(86) PCT No.: PCT/JP2009/064183
§ 371 (c)(1),
(2), (4) Date: Apr. 20, 2012

(87) PCT Pub. No.: WO2011/018843
PCT Pub. Date: Feb. 17, 2011

(65) Prior Publication Data
US 2012/0194142 A1    Aug. 2, 2012

(51) Int. Cl.
*F16H 3/72*    (2006.01)
(52) U.S. Cl.
USPC .............................. 290/45; 290/1 R
(58) Field of Classification Search
USPC .................................... 290/1 R, 45
See application file for complete search history.

(56) References Cited

U.S. PATENT DOCUMENTS

2005/0045435 A1   3/2005  Lee
2008/0263731 A1*  10/2008 Tabe ............................. 903/903

FOREIGN PATENT DOCUMENTS

| JP | 64 030401 | 2/1989 |
|---|---|---|
| JP | 09 263177 | 10/1997 |
| JP | 2001 332293 | 11/2001 |
| JP | 2005-076882 A | 3/2005 |
| JP | 2008 312437 | 12/2008 |
| JP | 2009-210054 | 9/2009 |

OTHER PUBLICATIONS

International Preliminary Report on Patentability issued Mar. 15, 2012 in patent application No. PCT/JP2009/064183 filed Aug. 11, 2009.
International Search Report Issued Nov. 24, 2009 in PCT/JP09/064183 Filed Aug. 11, 2009.

* cited by examiner

*Primary Examiner* — Tho D Ta
(74) *Attorney, Agent, or Firm* — Oblon, Spivak, McClelland, Maier & Neustadt, L.L.P.

(57) ABSTRACT

Power generation efficiency is improved with a simple configuration. A braking device is provided with a brake rotor which rotates on a central axis, and friction portions which are in frictional contact with the brake rotor. A coil is wound around the outer peripheral portion of the brake rotor. A friction portion has the north pole of a magnet, and a friction portion has the south pole of a magnet. The braking device generates electricity by using an electromagnetic induction phenomenon and an electrostatic phenomenon that are caused by the interaction between the outer peripheral portion and the friction portion, for example, at the time of braking. As a result, the configuration can be simplified and the amount of power generation is not likely to be limited by a motor capability because there is very little need to use the motor as a generator. Furthermore, the friction energy itself converted from the kinetic energy of the brake rotor can be converted into electrical energy to suppress the friction energy from being lost as heat energy.

11 Claims, 9 Drawing Sheets

POWER GENERATING DEVICE AND BRAKING DEVICE

TECHNICAL FIELD

The present invention relates to a power generating device and a braking device.

BACKGROUND ART

As a power generating device in the related art, there is known a power generating device that is mounted on a vehicle and generates power by converting kinetic energy into electrical energy. The braking device disclosed in, for example, Patent Literature 1 to be described below generates power by operating a motor, which is separately provided, by using the rotation of a tire (that is, by using a motor as a generator).

CITATION LIST

Patent Literature

[Patent Literature 1] Japanese Unexamined Patent Application Publication No. 2008-312437

SUMMARY OF INVENTION

Technical Problem

Here, in recent years, there has been a demand for the improvement of power generation efficiency by a simple structure in the above-mentioned power generating device.

Accordingly, an object of the invention is to provide a power generating device and a braking device that can improve power generation efficiency by a simple structure.

Solution to Problem

In order to achieve the above-mentioned object, according to the invention, there is provided a power generating device that is mounted on a vehicle and generates power by converting kinetic energy into electrical energy. The power generating device includes a rotating body that has a central axis and is rotated about the central axis, a friction member that comes into frictional contact with the rotating body, a first power generating element portion that is provided at the rotating body, and a second power generating element portion that is provided at the friction member. The first and second power generating element portions generate power by using at least one of an electromagnetic induction phenomenon and an electrostatic phenomenon that are caused by an interaction between the first and second power generating element portions.

In the power generating device according to the invention, power is generated by using at least one of an electromagnetic induction phenomenon and an electrostatic phenomenon that are caused by an interaction between the first power generating element portion provided at the rotating body and the second power generating element portion provided at the friction member coming into frictional contact with the rotating body. Accordingly, there is little need to use a motor as a generator, so that it is possible to simplify the structure of the braking device. Further, since there is little need to use a motor as described above, it is possible to suppress that the amount of generated power is limited by the capability of a motor. Furthermore, since friction energy itself converted from the kinetic energy of the rotating body is converted into electrical energy, it is possible to suppress that the friction energy is lost as heat energy. Accordingly, according to the invention, it is possible to improve power generation efficiency by a simple structure.

Further, as the structure that preferably obtains the above-mentioned operational effect, specifically, there may be provided a structure where the first power generating element portion includes an electromagnetic inductor and the second power generating element portion includes magnetic bodies provided integrally with the friction member and adapted so that the first power generating element portion is interposed between the magnetic bodies.

Furthermore, it is preferable that the magnetic bodies be adapted so that the generation and stopping of magnetic forces of the magnetic bodies can be controlled. In this case, it is possible to suppress that foreign materials such as iron powder are interposed between friction surfaces of, for example, the rotating body and the friction member.

Moreover, it is preferable that the magnetic bodies be adapted so that magnetic flux densities of the magnetic bodies are changed by heat. In this case, it is possible to increase an electromotive force generated by an electromagnetic induction phenomenon, so that it is possible to further improve power generation efficiency.

Further, it is preferable that the power generating device further include a magnetic flux density controller controlling the magnetic flux densities of the magnetic bodies. In this case, it is possible to control an electromotive force, which is generated by an electromagnetic induction phenomenon, by controlling the magnetic flux densities. As a result, it is possible to easily control power generation efficiency.

Furthermore, as the structure that preferably obtains the above-mentioned operational effect, specifically, there may be provided a structure where the first power generating element portion includes a first magnetic body and the second power generating element portion includes a second magnetic body and an electromagnetic inductor that is adapted so as to be interposed between the first and second magnetic bodies.

Moreover, it is preferable that the power generating device further include electrical connection portions. The electrical connection portions may be provided at the rotating body and the friction member, respectively, and may control the opening and closing of a circuit including the electromagnetic inductor by controlling whether or not the electrical connection portions are electrically connected to each other. In this case, it is possible to control the ON/OFF of power generation by the electrical connection portions.

Further, it is preferable that at least a part of the rotating body be covered with an insulating body. In this case, it is possible to suppress that generated power is discharged through the rotating body.

Furthermore, it is preferable that the rotating body and the first power generating element portion be manufactured by integral molding. In this case, for example, the first power generating element portion is disposed in advance in a mold and metal or the like having a melting point lower than the melting point of the first power generating element portion is cast, so that it is possible to integrally manufacture the rotating body and the first power generating element portion with ease.

Moreover, according to the invention, there is provided a braking device that includes the power generating device. The rotating body is a brake rotor, and the friction member is a brake pad.

Since the braking device includes the power generating device even in this invention, the operational effect capable of improving power generation efficiency by a simple structure is obtained.

Advantageous Effects of Invention

According to the invention, it is possible to improve power generation efficiency by a simple structure.

DESCRIPTION OF EMBODIMENTS

Figure 1:
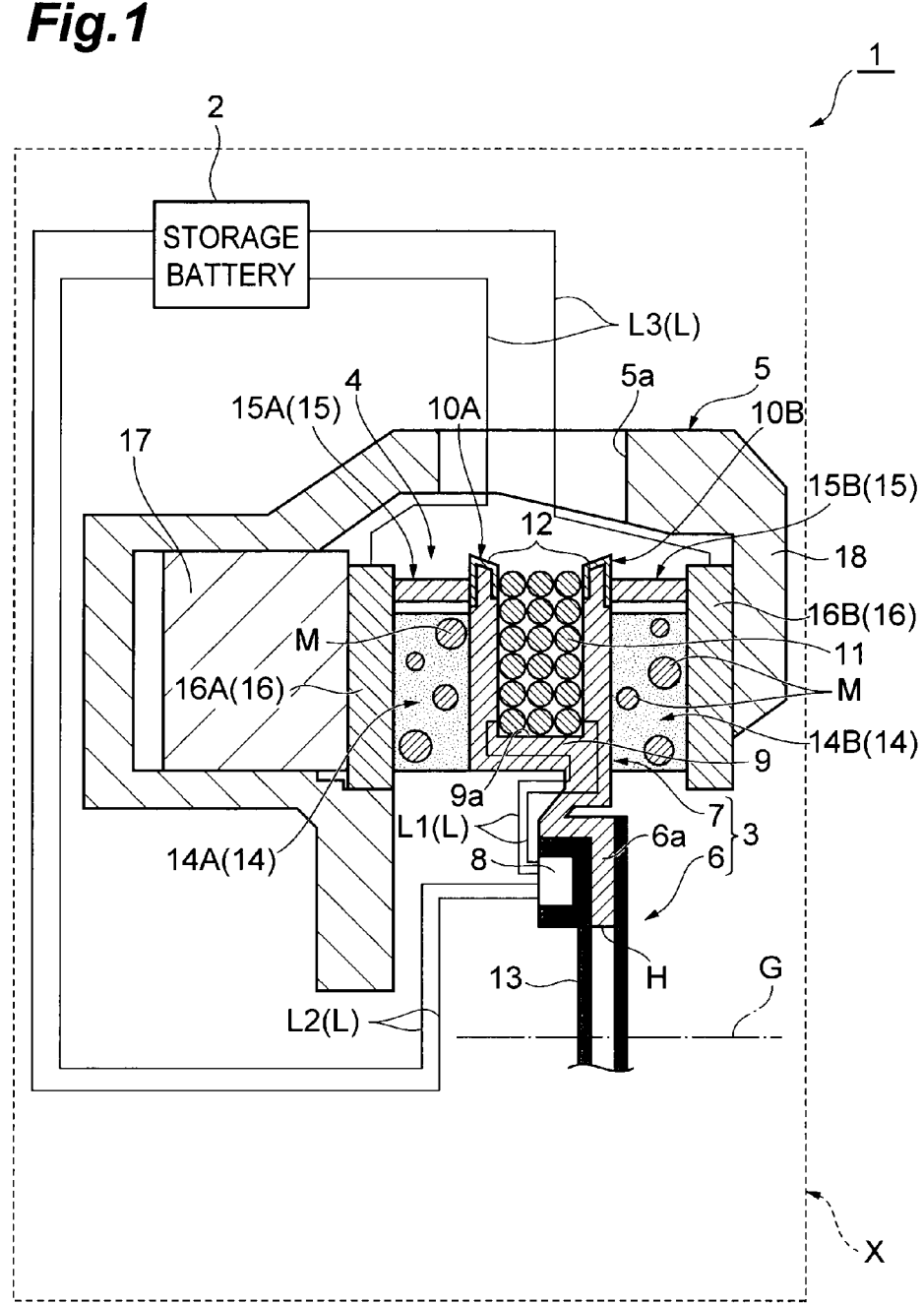
FIG. 1 is a schematic cross-section elevation view of a braking device according to a first embodiment of the invention.

Preferred embodiments of the invention will be described in detail below with reference to the drawings. Meanwhile, the same or corresponding elements are denoted by the same reference numerals in the following description and repeated description thereof will be omitted.

First Embodiment

Figure 2:
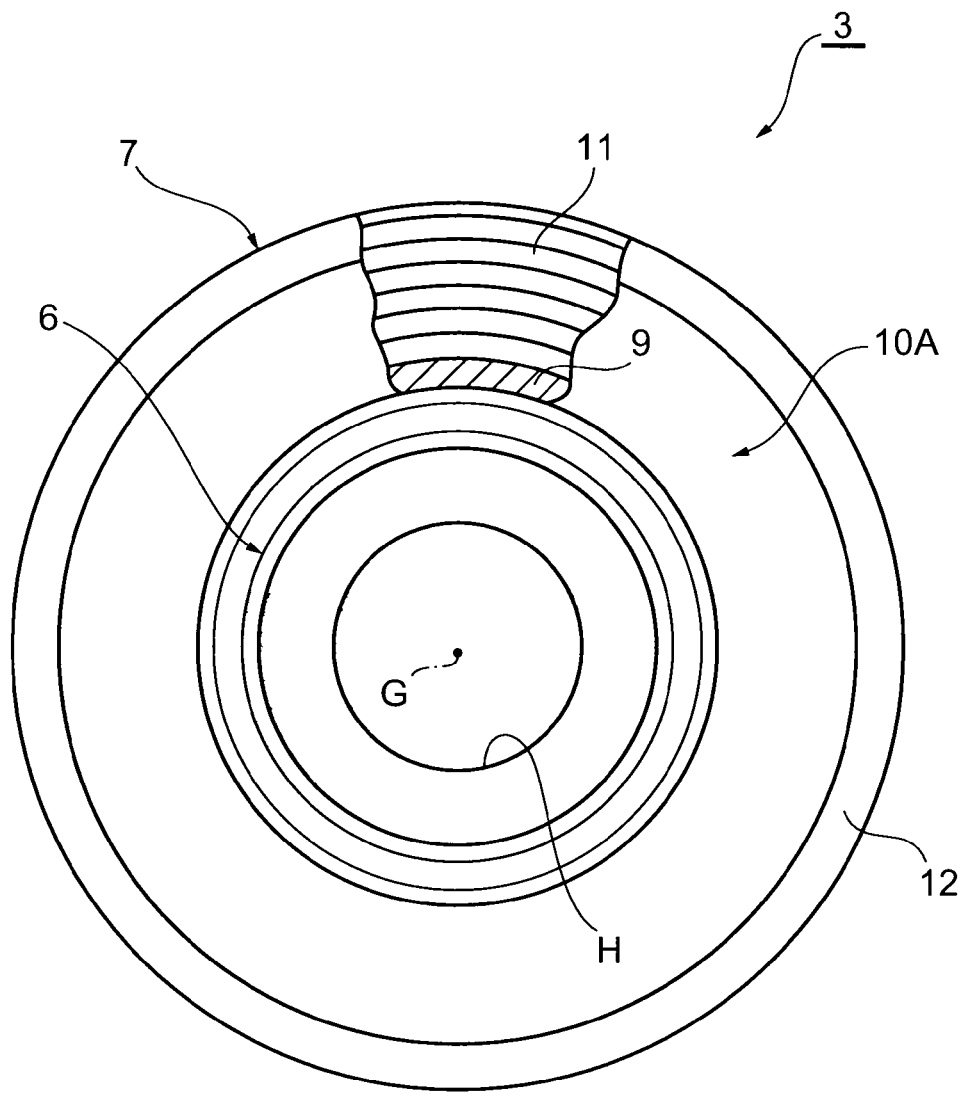
FIG. 2 is a left side view of a brake rotor of the braking device of FIG. 1.
Figure 3:
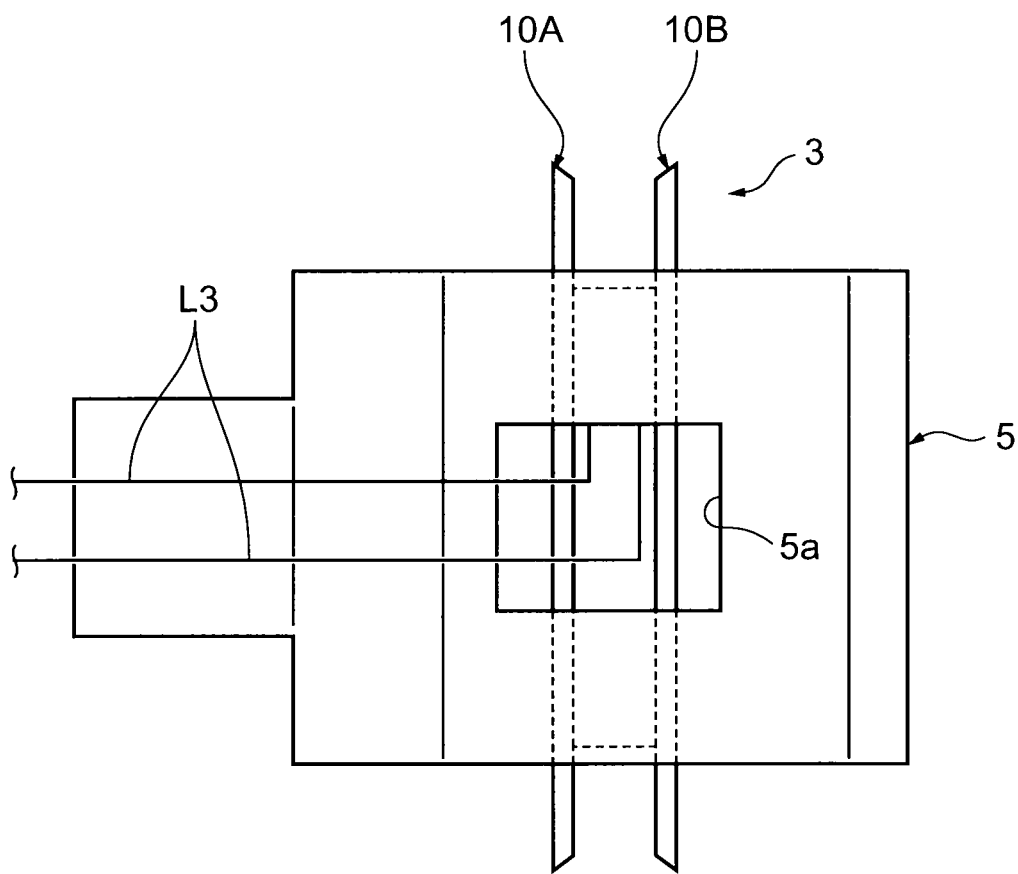
FIG. 3 is a plan view of the braking device of FIG. 1.

First, a first embodiment of the invention will be described. FIG. 1 is a schematic cross-section elevation view of a braking device according to a first embodiment of the invention. FIG. 2 is a left side view of a brake rotor of the braking device of FIG. 1. FIG. 3 is a plan view of the braking device of FIG. 1.

As shown in FIG. 1, a braking device 1 according to this embodiment is mounted on a vehicle X such as an automobile. The braking device 1 functions to brake (decelerate or stop) the traveling (moving) vehicle X. In addition, the braking device 1 functions as a power generating device. Specifically, the braking device 1 generates power by converting the kinetic energy of the vehicle X into electrical energy, and stores the generated power in a storage battery 2.

The braking device 1 includes a brake rotor (rotating body) 3, a fixing mechanism 4, and a caliper 5. The brake rotor 3 has a central axis G, and is rotated together with a tire of the vehicle X about the central axis G as a rotation axis. As shown in FIGS. 1 and 2, the brake rotor 3 has an annular and axisymmetric structure as seen in the direction of the central axis G. The brake rotor 3 includes a dish-shaped body portion 6 and an outer peripheral portion 7 that is formed so as to continue to the outer periphery of the body portion 6.

A circular through hole H, which has a center on the central axis G, is formed at the center of the body portion 6. A slip ring 8 is provided on a bottom wall 6a of the body portion 6. The slip ring 8 prevents the twisting or cutting of conducting wires L, which is caused by rotation, between a rotating object (here, the brake rotor 3) and a stationary object (here, the storage battery 2). Conducting wires L1, which are connected to a coil 11 to be described below, and conducting wires L2, which are connected to the storage battery 2, are connected to the slip ring 8 described here.

The outer peripheral portion 7 includes a cylindrical portion 9 of which the axial direction corresponds to the central axis G, and flange portions 10A and 10B that protrude from both ends of the cylindrical portion 9 in the direction of the central axis G to the outside in a radial direction. A coil (electromagnetic inductor) 11 is disposed between the flange portions 10A and 10B formed on an outer peripheral surface 9a of the cylindrical portion 9.

The coil 11 is formed so as to be wound around the central axis G. A carbon nanotube, which is light and has a small diameter and high conductivity, is used as the material of the coil 11.

Conductors 12 are formed on the surfaces of the outer edge portions of the flange portions 10A and 10B, respectively. The conductors 12 are to control the opening and closing of a circuit (hereinafter, referred to as an "electromagnetic induction circuit") including the coil 11. The conductors 12 come into contact with the coil 11 disposed between the flange portions 10A and 10B, so that the conductors 12 are electrically connected to each other. Further, the conductors 12 are adapted so as to be capable of being electrically connected to brush portions 15 to be described below. Accordingly, the conductors 12 allow the coil 11 and the brush portions 15 to be electrically connected to each other.

Moreover, the brake rotor 3 includes an insulating body 13 that is provided so as to cover at least a part of the body portion 6. The insulating body 13 described here is provided so as to cover the slip ring 8 and the bottom wall 6a of the body portion 6.

This brake rotor 3 and the coil 11 are manufactured by integral molding. Here, the coil 11 is disposed in advance in a mold and metal or the like having a melting point lower than the melting point of the coil 11 is cast, so that the brake rotor 3 is molded integrally with the coil 11.

As shown in FIG. 1, the fixing mechanism 4 includes friction portions (friction members) 14, the brush portions 15, and fixing portions 16. A pair of friction portions 14 is provided so as to face each other in the direction of the central axis G. The friction portions 14A and 14B come into frictional contact with the outer surfaces of the flange portions 10A and 10B of the brake rotor 3. The friction portions 14A and 14B described here come into frictional contact with inner areas of the outer surfaces of the flange portions 10A and 10B, which are positioned inside the conductors 12, so that the inner areas are interposed between the friction portions 14A and 14B in the direction of the central axis G.

These friction portions 14A and 14B have a function as a brake pad for braking the vehicle X. That is, the friction portions 14A and 14B press the brake rotor 3 so that the flange portions 10A and 10B are interposed between the friction portions 14A and 14B. Accordingly, the friction portions 14A and 14B generate a frictional force for stopping the rotation of the brake rotor 3.

Further, the friction portions 14A and 14B also function as magnetic bodies as permanent magnets that generate a magnetic field. In other words, the magnetic bodies are provided integrally with (integrated with) the friction portions 14. Here, one friction portion 14A has the north pole of a magnet, and the other friction portion 14B has the south pole of a magnet.

Figure 4:
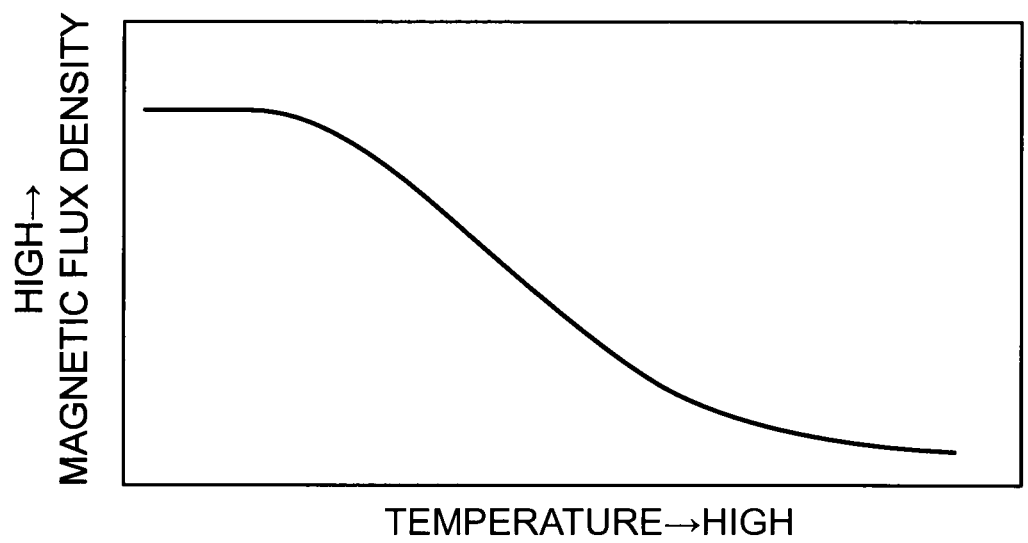
FIG. 4 is a graph showing a relationship between magnetic flux density and temperature of a magnetic material having a Curie point.

Furthermore, the friction portions 14 are adapted so that the magnetic flux densities (the intensity of magnetic fields) of the friction portions 14 are changed by heat. Here, the friction portions 14 are made of a material containing a magnetic material M of which the magnetic flux density is changed by heat. A material having a Curie point (a material containing at least one of, for example, iron, cobalt, gadolinium, crystal, and the like) is used as the magnetic material M of which the magnetic flux density is changed by heat. Accordingly, as shown in FIG. 4, the friction portion 14 has a correlative relationship where a magnetic flux density decreases in the shape of a sine curve as the temperature rises.

Returning to FIG. 1, the brush portions 15 extend in the direction of the central axis G. A pair of brush portions 15 is provided so as to face each other in the direction of the central axis G. Further, the brush portions 15A and 15B come into frictional contact with the conductors 12 and 12 of the brake rotor 3, respectively. Accordingly, the conductors 12 and 12 are interposed between the brush portions 15A and 15B in the direction of the central axis G.

The brush portions 15 control the opening and closing of an electromagnetic induction circuit by controlling the electrical connection between the brush portions 15 and the conductors 12. For example, when the brush portions 15 are pressed against the conductors 12 to a certain degree or more during the braking of the vehicle X, the brush portions 15 are electrically connected to the coil 11 through the conductors 12. Accordingly, an electromagnetic induction circuit becomes a closed circuit. Meanwhile, a circuit or the like, which is connected to the brush portions 15 and the conductors 12, may be separately provided, and an electromagnetic induction circuit may be formed as a closed circuit when the amount of current flowing through the brush portions 15 and the conductors 12 is larger than a predetermined amount.

The fixing portions 16 are made of a conductive material such as metal. A pair of fixing portions 16 is provided so as to face each other in the direction of the central axis G. These fixing portions 16A and 16B are disposed so that the friction portions 14 and the brush portions 15 are interposed between the fixing portions 16A and 16B in the direction of the central axis G. Further, the fixing portions 16A and 16B are respectively connected to the friction portions 14A and 14B, and are respectively connected so as to be electrically connected to the brush portions 15A and 15B. Conducting wires L3, which are connected to the storage battery 2, are connected to the fixing portions 16.

The caliper 5 is a housing that receives the fixing mechanism 4, and includes a piston part 17 and an arm part 18. The piston part 17 and the arm part 18 are formed so that the fixing portions 16 are interposed between the piston part 17 and the arm part 18 in the direction of the central axis G. The piston part 17 is to press the fixing portions 16 against the brake rotor 3. The piston part 17 described here is connected to the fixing portion 16A and is adapted to be movable in the direction of the central axis G.

The arm part 18 is connected to the fixing portion 16B. The arm part 18 is adapted to cooperate with the piston part 17, and is moved in a direction different from the moving direction of the piston part 17 in the direction of the central axis G. Specifically, the arm part 18 is moved toward the brake rotor 3 as the piston part 17 is driven toward the brake rotor 3. Meanwhile, the arm part 18 is moved to be separated from the brake rotor 3 as the piston part 17 is driven to be separated from the brake rotor 3.

Further, as shown in FIG. 3, a through hole 5a into which the conducting wires L3 are inserted is formed at the caliper 5. The through hole 5a is formed at a position where the brake rotor 3 faces the inside of the through hole 5a, and extends so that the radial direction of the brake rotor 3 is a direction where the through hole 5a passes through the caliper 5.

In the braking device 1 having the above-mentioned structure, the brake rotor 3 is rotated together with a tire about the central axis G during traveling of the vehicle X (normal time). During the traveling, the friction portions 14A and 14B and the brush portions 15A and 15B slightly come into frictional contact with the flange portions 10A and 10B of the brake rotor 3 by a frictional force that does not hinder the rotation of the brake rotor 3. Furthermore, the brush portions 15 are not electrically connected to the conductors 12 during the traveling, so that an electromagnetic induction circuit becomes an open circuit.

Moreover, when the vehicle X is to be braked through a braking operation performed by, for example, a driver (during braking), the following action is performed. That is, the piston part 17 of the caliper 5 is driven according to the above-mentioned braking operation, so that the piston part 17 is moved toward the brake rotor 3. In addition to this, the arm part 18 of the caliper 5 is moved toward the brake rotor 3.

Accordingly, the friction portions 14A and 14B and the brush portions 15A and 15B press the flange portions 10A and 10B so that the flange portions 10A and 10B are interposed between the friction portions 14A and 14B and the brush portions 15A and 15B. As a result, the brake rotor 3 is also braked by a frictional force generated between the friction portions 14A and 14B and the flange portions 10A and 10B and the vehicle X is braked.

In this case, in this embodiment, the brush portions 15 are electrically connected to the conductors 12, so that an electromagnetic induction circuit becomes a closed circuit. As a result, when the coil 11 is moved in the magnetic field between the friction portions 14A and 14B, a potential difference (voltage) is generated in the coil 11 by an electromagnetic induction phenomenon. Accordingly, induced current flows in the electromagnetic induction circuit. Further, since the friction portions 14A and 14B come into frictional contact with the flange portions 10A and 10B, respectively, static electricity is generated by frictional charge. Accordingly, current caused by the static electricity flows in the electromagnetic induction circuit.

That is, in this embodiment, the kinetic energy of the brake rotor 3 is converted into electrical energy by an electrostatic phenomenon and an electromagnetic induction phenomenon occurring between the outer peripheral portion 7 of the brake rotor 3 around which the coil 11 is wound and the friction portions 14A and 14B as the magnetic bodies that come into frictional contact with the flange portions 10A and 10B of the outer peripheral portion 7, so that power is generated.

Further, the current flowing in the electromagnetic induction circuit is stored in the storage battery 2. Meanwhile, when the kinetic energy of the brake rotor 3 is converted into electrical energy, the vehicle X is further braked according to the conversion.

Furthermore, when a frictional force is generated between the friction portions 14A and 14B and the flange portions 10A and 10B, heat is generated during this time. As a result, the crystal structure of the friction portions 14A and 14B is changed by heat and the magnetic flux densities of the friction portions 14A and 14B are changed. Accordingly, a potential difference is generated in the coil 11 disposed between the friction portions 14A and 14B by an electromagnetic induction phenomenon even due to the change of the magnetic flux density caused by heat, so that induced current flows in the electromagnetic induction circuit.

As described above, according to this embodiment, there is little need to use a motor (in-wheel motor or the like) as a generator as in the related art. For this reason, it is possible to simplify the structure of the braking device and to reduce the size of the braking device. In addition, it is possible to suppress that the amount of generated power is limited by the capability of a motor or power cannot be generated at the time of full braking.

Moreover, since friction energy itself converted from the kinetic energy of the brake rotor 3 is converted into electrical energy, it is possible to suppress that the friction energy is lost as heat energy. As a result, it is possible to improve the energy recovery efficiency (regeneration performance) of the braking device.

Accordingly, in the braking device 1 according to this embodiment, it is possible to improve power generation efficiency by a simple structure when power is generated through the conversion of kinetic energy into electrical energy. That is, in this embodiment, it is possible to generate power in a wheel by the combination of the power generating device and the braking device. Meanwhile, since this embodiment may be applied to a vehicle that does not use a motor as a power source, the range of application of this embodiment is wide.

Further, in this embodiment, the magnetic flux densities of the friction portions 14 are changed by heat as described above. Accordingly, it is possible to increase an electromotive force generated by an electromagnetic induction phenomenon, so that it is possible to further improve power generation efficiency.

Furthermore, in this embodiment, as described above, the conductors 12 and the brush portions 15 are provided and the opening and closing of a circuit of the coil 11 is controlled by the control of whether or not the conductors 12 are electrically connected to the brush portions 15. Accordingly, it is possible to easily control the ON/OFF of power generation by a simple structure. Moreover, since it is possible to control the ON/OFF of power generation in this way, current is always stored in the storage battery 2, so that it is possible to prevent the overcharge of the storage battery 2.

Further, in this embodiment, the slip ring 8 and the bottom wall 6a of the body portion 6 of the brake rotor 3 are covered with the insulating body 13 as described above. Accordingly, it is possible to suppress that the brake rotor 3 comes into contact with a wheel, a hub, and the like disposed therearound, current flows in the wheel, the hub, and the like, and generated power is discharged (power storage efficiency deteriorates).

Furthermore, in this embodiment, the brake rotor 3 and the coil are manufactured by integral molding as described above. Accordingly, the brake rotor 3 and the coil 11 can be easily formed integrally with each other, so that it is possible to easily manufacture the braking device 1.

Moreover, in this embodiment, a carbon nanotube is used as the material of the coil 11. For this reason, it is possible to reduce the weight of the braking device 1, to make the braking device 1 compact, and to improve the power generation efficiency of the braking device.

Meanwhile, in the above description, the outer peripheral portion 7 of the brake rotor 3 forms a first power generating element portion and the friction portions 14 form a second power generating element portion. Further, the brush portions 15 and the conductors 12 form electrical connection portions.

Second Embodiment

Next, a second embodiment of the invention will be described. Meanwhile, the difference between the first embodiment and this embodiment will be mainly described in the description of this embodiment.

Figure 5:
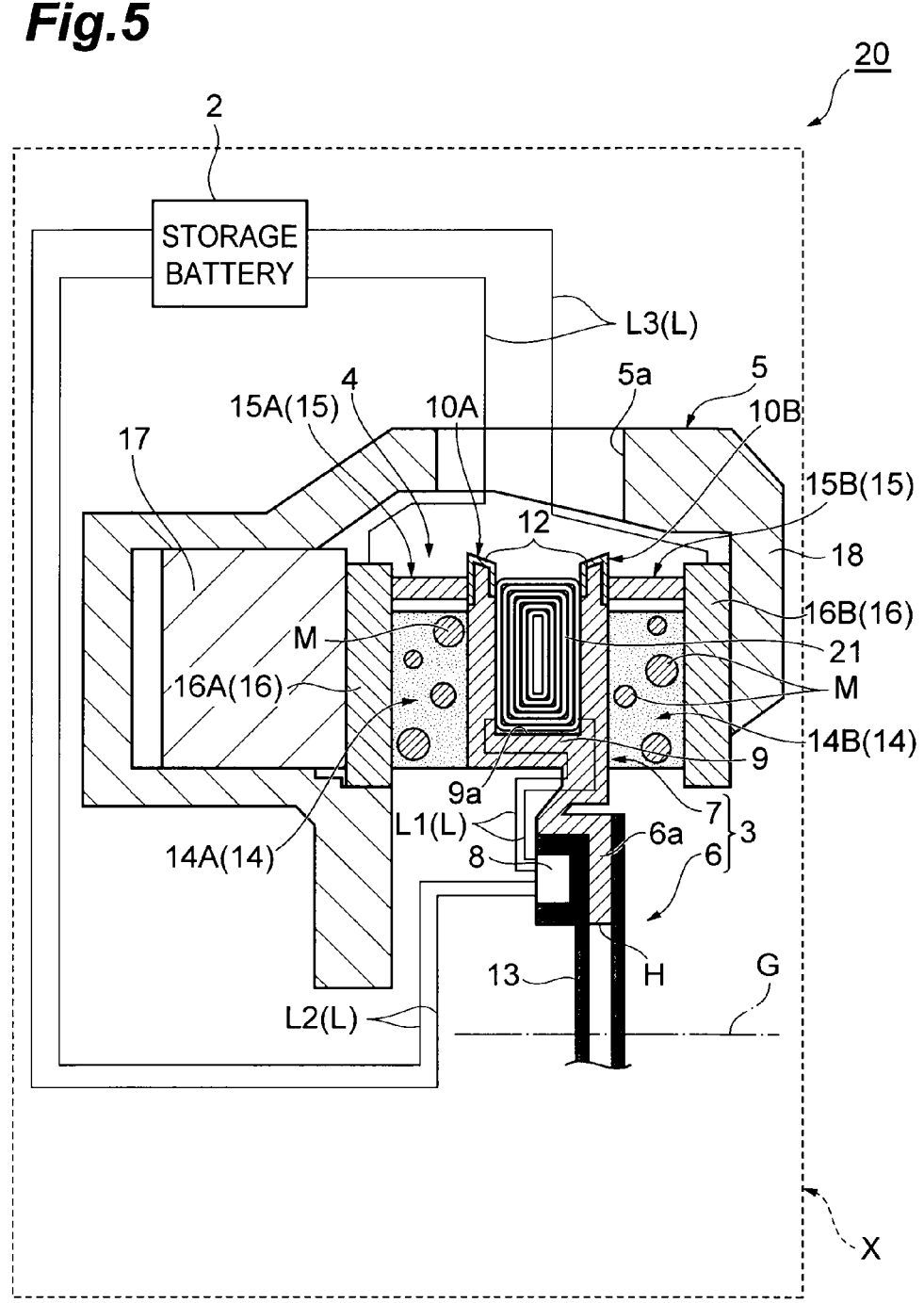
FIG. 5 is a schematic cross-section elevation view of a braking device according to a second embodiment of the invention.

FIG. 5 is a schematic cross-section elevation view of a braking device according to a second embodiment of the invention. A braking device 20 according to this embodiment is different from the braking device 1 according to the above-mentioned embodiment in that a coil (electromagnetic inductor) 21 is provided as shown in FIG. 5 instead of the coil 11 (see FIG. 1) wound around the central axis G.

The coil 21 is formed so as to be wound around a direction extending along the circumferential direction of a brake rotor 3 at the middle position between flange portions 10A and 10B, and is integrated with the brake rotor 3.

Even in the braking device 20 according to this embodiment, the same effect as the above-mentioned effect, that is, an effect of improving power generation efficiency by a simple structure is obtained. Moreover, in this embodiment, the coil 21 is wound around the circumferential direction of the brake rotor 3 as described above. For this purpose, for example, in order to manufacture the brake rotor 3 and the coil 21 by integral molding, the coil 21 may be wound in advance and the wound coil 21 may be disposed in a mold. Accordingly, it is possible to integrally mold the brake rotor 3 and the coil 21 with ease.

Third Embodiment

Next, a third embodiment of the invention will be described. Meanwhile, the difference between the first embodiment and this embodiment will be mainly described in the description of this embodiment.

Figure 6:
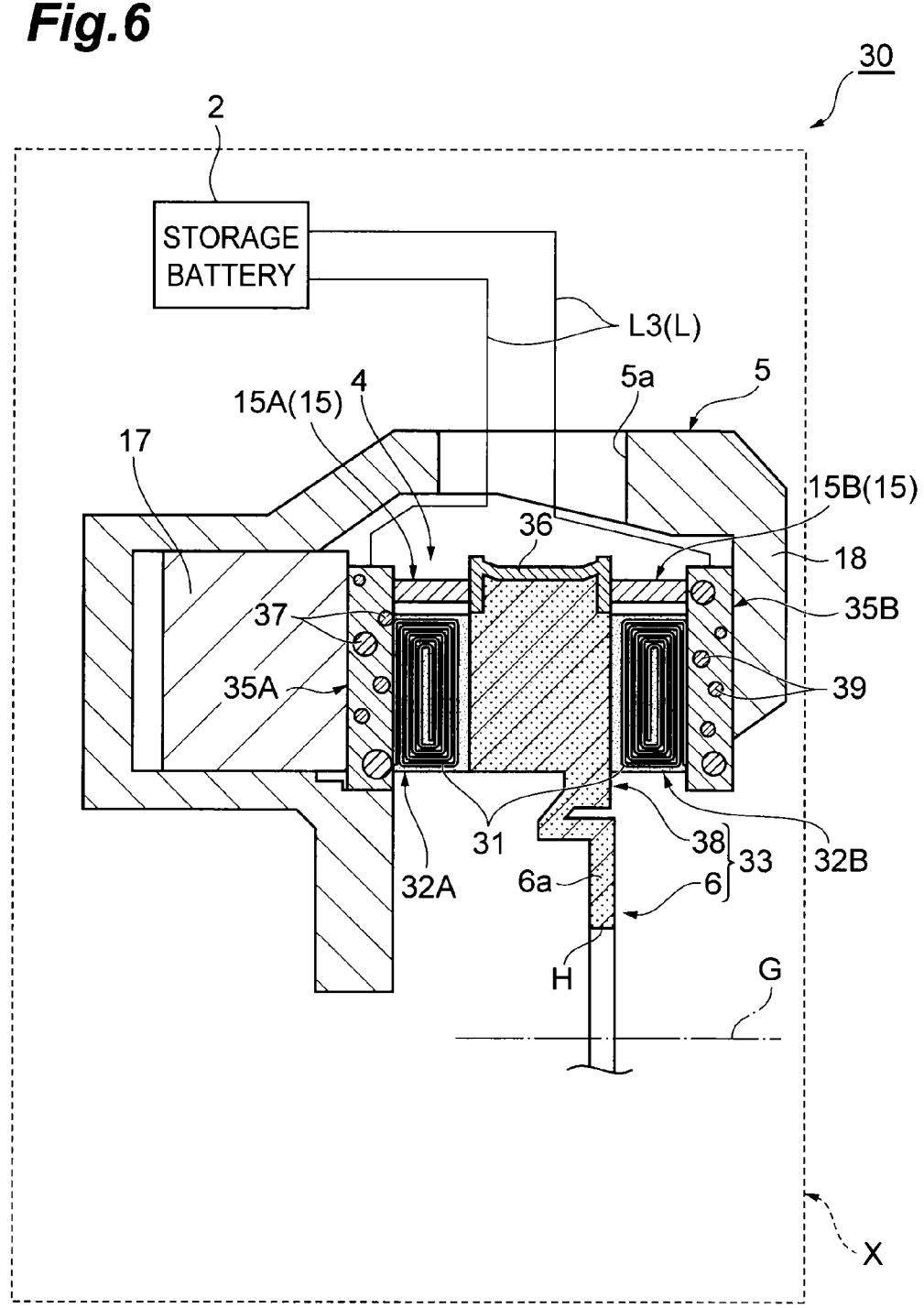
FIG. 6 is a schematic cross-section elevation view of a braking device according to a third embodiment of the invention.

FIG. 6 is a schematic cross-section elevation view of a braking device according to a third embodiment of the invention. As shown in FIG. 6, in a braking device 30 according to this embodiment, a pair of friction portions (friction portions) 32A and 32B, which is provided with coils (electromagnetic inductors) 31, respectively, comes into frictional contact with a brake rotor (rotating body) 33 formed of a magnetic body so that the brake rotor 33 is interposed between the friction portions 32A and 32B in the direction of the central axis G. Moreover, in the braking device 30, a pair of fixing portions (second magnetic bodies) 35A and 35B is connected to the friction portions 32A and 32B coming into frictional contact with the fixing portions, respectively, so that the friction portions 32A and 32B are interposed between the fixing portions 35A and 35B in the direction of the central axis G.

The coils 31 and 31 are formed so as to be wound around a direction extending along the circumferential direction of the brake rotor at the middle positions of the respective friction portions 32A and 32B, respectively, and are integrated with the friction portions 32A and 32B, respectively. The brake rotor 33 includes an outer peripheral portion (first magnetic body) 38 that is formed so as to be continued to the outer periphery of a body portion 6 and has an annular shape. One end portion (left portion in the drawing) of the outer peripheral portion 38 described here in the direction of the central axis G has the north pole of a magnet, and the other end portion (right portion in the drawing) has the south pole of a magnet.

A conductor 36 is formed on the outer surface of the outer edge portion of the outer peripheral portion 38. The conductor 36 is to control the opening and closing of an electromagnetic induction circuit, and is adapted so as to be capable of being electrically connected to brush portions 15A and 15B. Accordingly, the conductor 36 allows the brush portions 15A and 15B to be electrically connected to each other.

The fixing portion 35A contains a magnetic material 37, and has the south pole of a magnet here. The fixing portion 35A is electrically connected to the coil 31. Further, the fixing portion 35B contains a magnetic material 39, and has the north pole of a magnet here. The fixing portion 35B is electrically connected to the coil 31.

In the braking device 30 having the above-mentioned structure, the following action is performed when the friction portions 32A and 32B and the brush portions 15A and 15B press the outer peripheral portion 38 so that the peripheral portion 38 is interposed between the friction portions 32A and 32B and the brush portions 15A and 15B.

That is, the brush portions 15A and 15B are electrically connected to the conductor 36, so that an electromagnetic induction circuit becomes a closed circuit. As a result, when the coils 31 are moved in the magnetic field between the fixing portion 35A and the outer peripheral portion 38 and the magnetic field between the fixing portion 35B and the outer peripheral portion 38, a potential difference is generated in the coils 31 by an electromagnetic induction phenomenon. Accordingly, induced current flows in the electromagnetic induction circuit. Further, since the friction portions 32A and 32B come into frictional contact with the outer peripheral portion 38, static electricity is generated by frictional charge. Accordingly, current caused by the static electricity flows in the electromagnetic induction circuit. Furthermore, the current flowing in the electromagnetic induction circuit is stored in the storage battery 2.

Therefore, even in this embodiment, the same effect as the above-mentioned effect, that is, an effect of improving power generation efficiency by a simple structure is obtained. Moreover, since conducting wires do not need to be connected to the brake rotor 33 as a rotating object in this embodiment, it is possible to simplify the structure of the braking device and to improve the reliability of the braking device.

Meanwhile, in the above description, the outer peripheral portion 38 of the brake rotor 33 forms a first power generating element portion and the coils 31 of the friction portions 32A and 32B and the fixing portions 35A and 35B form a second power generating element portion. Further, the brush portions 15 and the conductor 36 form electrical connection portions.

Fourth Embodiment

Next, a fourth embodiment of the invention will be described. Meanwhile, the difference between the first embodiment and this embodiment will be mainly described in the description of this embodiment.

Figure 7:
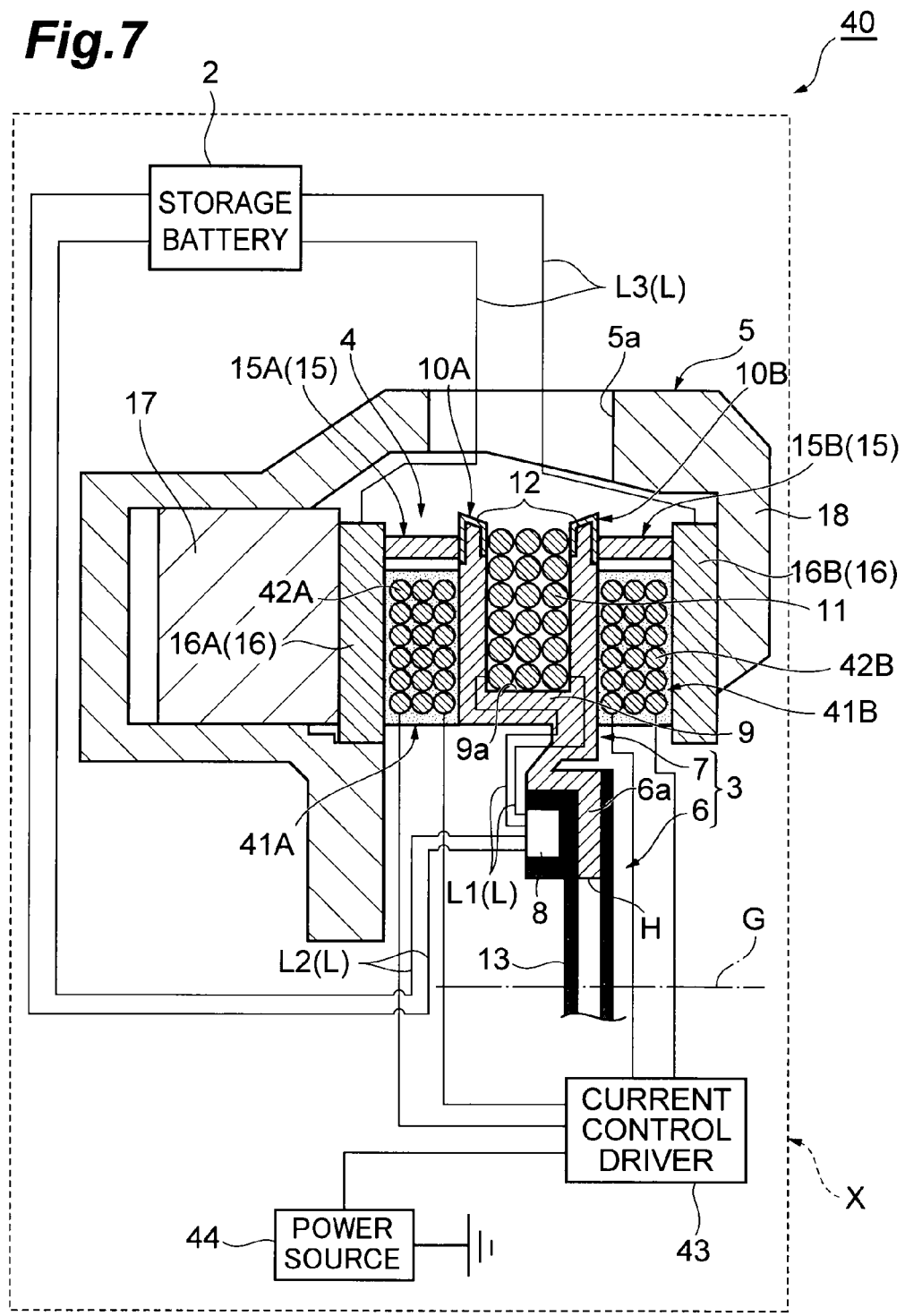
FIG. 7 is a schematic cross-section elevation view of a braking device according to a fourth embodiment of the invention.

FIG. 7 is a schematic cross-section elevation view of a braking device according to a fourth embodiment of the invention. A braking device 40 according to this embodiment is different from the braking device 1 according to the above-mentioned embodiment in that friction portions (friction members) 41A and 41B functioning as an electromagnet are provided as shown in FIG. 7 instead of the friction portions 14A and 14B functioning as a permanent magnet.

The friction portions 41A and 41B include electromagnetic coils 42A and 42B (magnetic bodies, second power generating element portions), respectively. The electromagnetic coils 42A and 42B are formed so as to be wound around a direction extending along the circumferential direction of a brake rotor 3 at the middle positions of the friction portions 41A and 41B, respectively, and are integrated with the friction portions 41A and 41B, respectively. A carbon nanotube is used as the material of each of the electromagnetic coils 42A and 42B. Further, one electromagnetic coil 42A has the north pole of a magnet and the other electromagnetic coil 42B has the south pole of a magnet.

A current control driver 43 is connected to these electromagnetic coils 42A and 42B. The current control driver 43 generates magnetic forces at the electromagnetic coils 42A and 42B by supplying current, which is supplied from a power source 44, to the electromagnetic coils 42A and 42B. That is, the electromagnetic coils 42A and 42B are adapted so that the generation and stopping of the magnetic forces of the electromagnetic coils 42A and 42B can be controlled. Further, the current control driver 43 controls a braking force for a vehicle X by controlling the current supplied to the electromagnetic coils 42A and 42B. Meanwhile, the power source 44 is grounded.

In the braking device 40 having the above-mentioned structure, current is not supplied to the electromagnetic coils 42A and 42B from the current control driver 43 during traveling of the vehicle X (normal time) and magnetic fields are not generated during this time.

Further, when the vehicle X is to be braked through a braking operation performed by, for example, a driver, the friction portions 41A and 41B and the brush portions 15A and 15B press an outer peripheral portion 7. In this case, the brush portions 15A and 15B are electrically connected to conductors 12, so that an electromagnetic induction circuit becomes a closed circuit.

In addition, current is supplied to the electromagnetic coils 42A and 42B from the current control driver 43, so that a magnetic field is generated between the friction portions 41A and 41B. As a result, when a coil 11 is moved in the magnetic field generated between the friction portions 41A and 41B, a potential difference is generated in the coil 11 by an electromagnetic induction phenomenon. Accordingly, induced current flows in the electromagnetic induction circuit. Further, since the friction portions 41A and 41B come into frictional contact with the outer peripheral portion 7, static electricity is generated by frictional charge. Accordingly, current caused by the static electricity flows in the electromagnetic induction circuit.

In this case, the current supplied to the electromagnetic coils 42A and 42B is controlled by the current control driver 43. As a result, a braking force for the vehicle X is controlled.

As described above, even in this embodiment, the same effect as the above-mentioned effect, that is, an effect of improving power generation efficiency by a simple structure is obtained. Further, since the generation and stopping of the magnetic forces of the electromagnetic coils 42A and 42B can be controlled in this embodiment, it is possible to suppress that foreign materials such as iron powder are interposed between friction surfaces of, for example, the friction portions 41A and 41B and the brake rotor 3. Furthermore, even if foreign materials are interposed between the friction surfaces, it is possible to discharge the foreign materials from the friction surfaces since the magnetic forces generated by the electromagnetic coils 42A and 42B are stopped when the vehicle is not braked.

Figure 8:
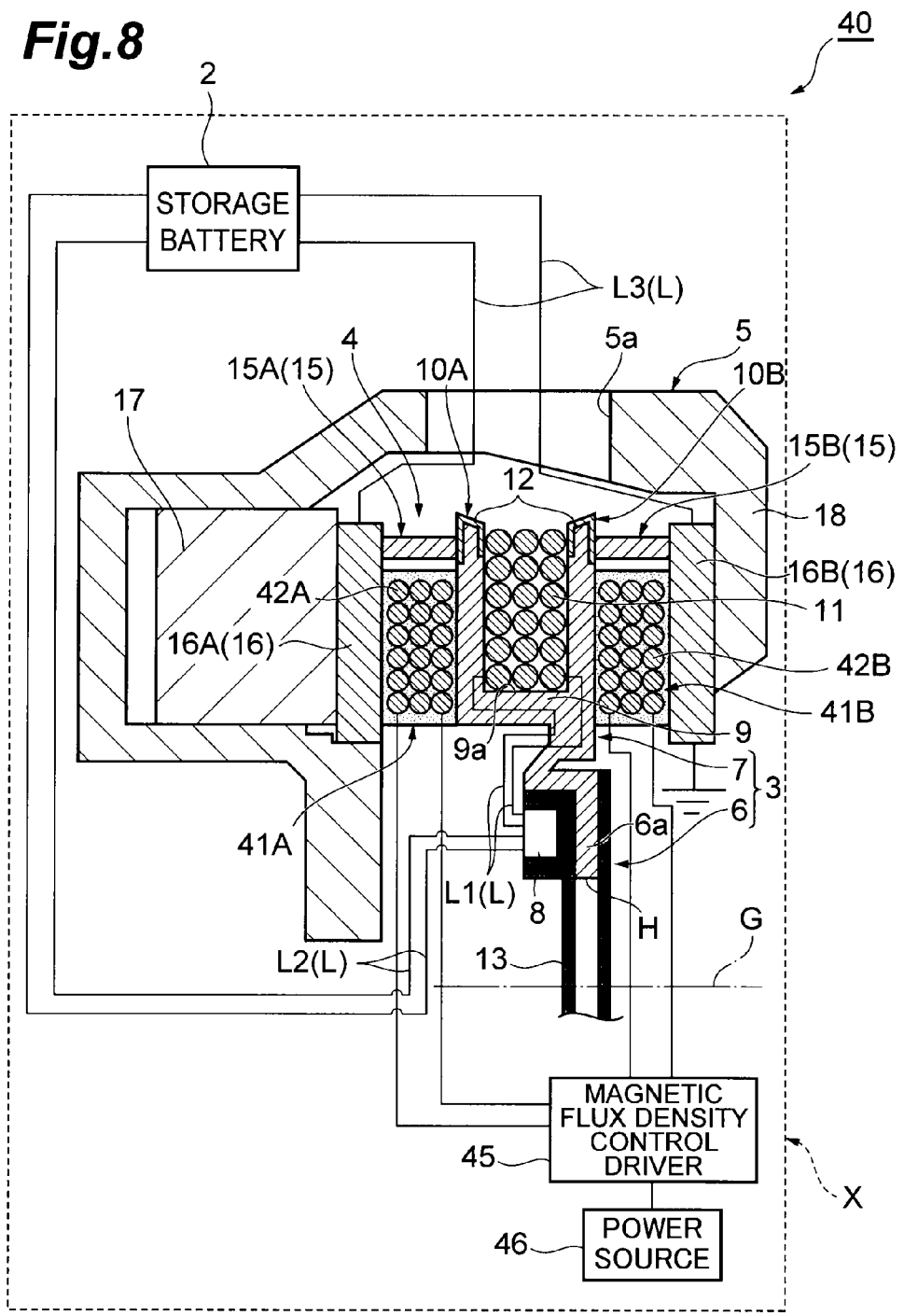
FIG. 8 is a cross-section elevation view of another example of the braking device of FIG. 7.

Meanwhile, in this embodiment, instead of the current control driver 43, a magnetic flux density control driver (magnetic flux density controller) 45 may be connected to the electromagnetic coils 42A and 42B as shown in FIG. 8. The magnetic flux density control driver 45 generates magnetic forces at the electromagnetic coils 42A and 42B by supplying current, which is supplied from a power source 46, to the electromagnetic coils 42A and 42B. In addition, the magnetic flux density control driver 45 controls a braking force for a vehicle X by controlling the magnetic forces (magnetic flux density) that are generated by the electromagnetic coils 42A and 42B. Meanwhile, the fixing portions 16 are grounded.

In this case, it is also possible to control an electromotive force, which is generated by an electromagnetic induction phenomenon, by controlling the magnetic forces of the electromagnetic coils 42A and 42B by the magnetic flux density control driver 45. As a result, it is possible to easily control the power generation efficiency of the braking device 40.

Fifth Embodiment

Next, a fifth embodiment of the invention will be described. Meanwhile, the difference between the first embodiment and this embodiment will be mainly described in the description of this embodiment.

Figure 9:
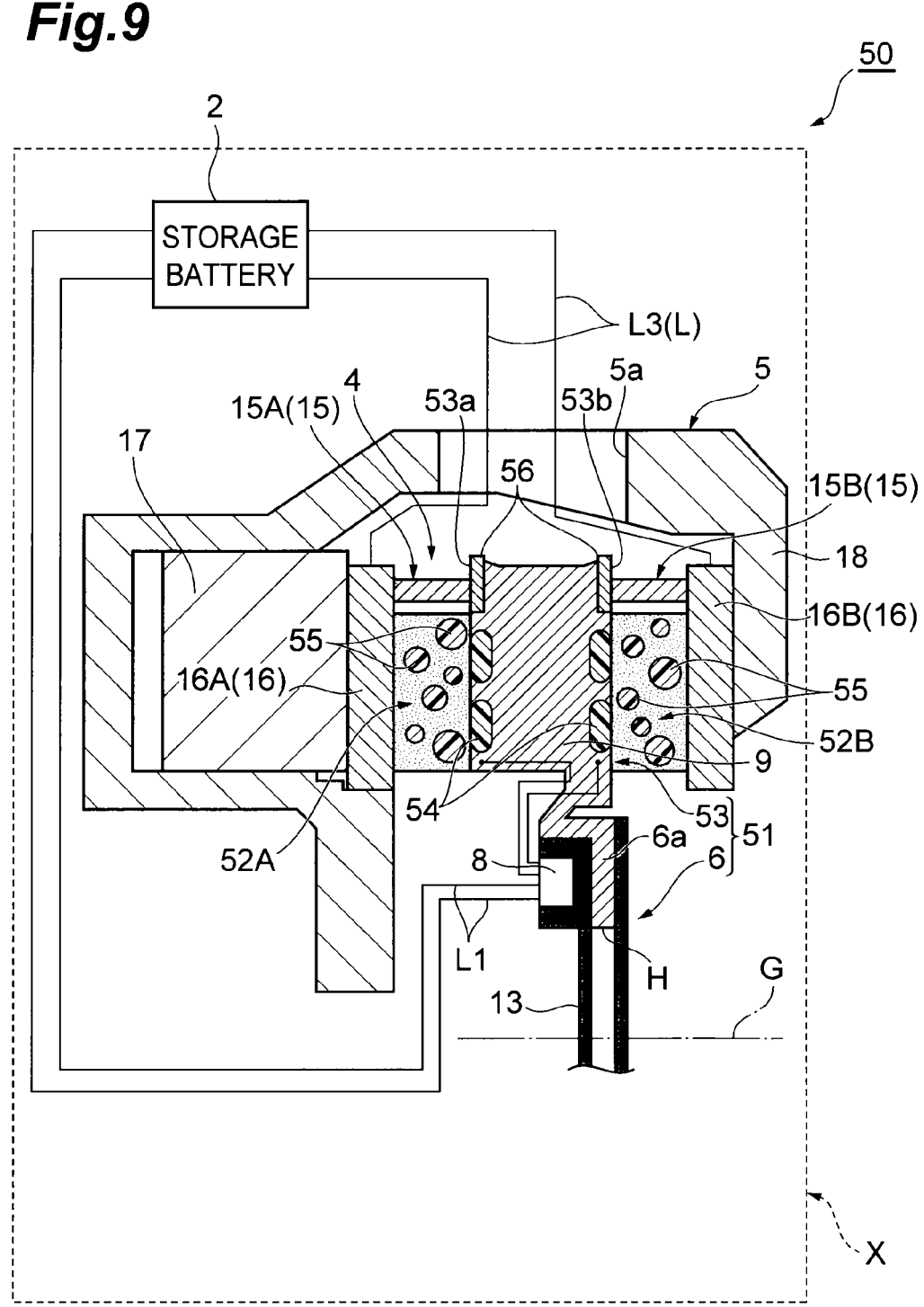
FIG. 9 is a schematic cross-section elevation view of a braking device according to a fifth embodiment of the invention.

FIG. 9 is a schematic cross-section elevation view of a braking device according to a fifth embodiment of the invention. A braking device 50 according to this embodiment is different from the braking device 1 in that power is generated by mainly using an electrostatic phenomenon as shown in FIG. 9. Specifically, the braking device 50 includes a brake rotor 51 instead of the brake rotor 3 (see FIG. 1) and friction portions 52A and 52B instead of the friction portions 14A and 14B (see FIG. 1).

The brake rotor 51 includes an outer peripheral portion 53. The outer peripheral portion 53 is formed of a conductive body, is formed so as to continue to the outer periphery of a body portion 6, and has an annular shape. The outer peripheral portion 53 includes insulating bodies 54 that are provided one end (left portion in the drawing) of the inner portion of the outer peripheral portion and the other end portion (right portion in the drawing) thereof in the direction of the central axis G. The friction portions 52A and 52B includes insulating bodies 55 therein. Conducting wires L1 are connected to the outer peripheral portion 53.

Further, conductors 56 are formed at the outer edge portions of the outer peripheral portion 53. The conductors 56 are disposed on side surfaces 53a and 53b of the outer peripheral portion 53 orthogonal to the direction of the central axis G, respectively. The conductors 56 are to control the opening and closing of a circuit (hereinafter, referred to as an "electrostatic circuit") where current generated by an electrostatic phenomenon flows. The conductors 56 are adapted so as to be capable of being electrically connected to brush portions 15A and 15B.

In the braking device 50 having the above-mentioned structure, the brush portions 15A and 15B are electrically connected to the conductors 56 when the friction portions 52A and 52B and the brush portions 15A and 15B press the outer peripheral portion 53. Accordingly, an electrostatic circuit becomes a closed circuit. Since the friction portions 52A and 52B come into frictional contact with the outer peripheral portion 53, static electricity is generated by frictional charge. Accordingly, current caused by the static electricity flows in the electrostatic circuit.

Therefore, even in this embodiment, the same effect as the above-mentioned effect, that is, an effect of improving power generation efficiency by a simple structure is obtained. Moreover, in this embodiment, the outer peripheral portion 53 and the friction portions 52A and 52B, which come into frictional contact with each other, contain the insulating bodies 54 and 55, respectively. Accordingly, the outer peripheral portion 53 and the friction portions 52A and 52B are insulated. Therefore, since an electrostatic phenomenon is positively generated, it is possible to further improve power generation efficiency.

Meanwhile, in the above description, the outer peripheral portion 53 of the brake rotor 51 forms a first power generating element portion and the friction portions 52A and 52B form a second power generating element portion. Further, the brush portions 15 and the conductor 56 form electrical connection portions.

Preferred embodiments of the invention have been described above. However, the invention is not limited to the above-mentioned embodiments.

For example, the invention has been applied while the brake rotor is used as a rotating body in the above-mentioned embodiments. However, for example, the invention may be applied while a flywheel, a clutch plate, a drive shaft, or the like is used as a rotating body.

Meanwhile, a magnetic material M of which the temperature exceeds the Curie point loses a magnetic property. However, when a magnetic field is applied to the magnetic material from the outside, the magnetic material has a magnetic property again. Accordingly, the above-mentioned property (a property where a magnetic flux density is changed by heat) is maintained semipermanently.

REFERENCE SIGNS LIST 1, 20, 30, 40, 50: braking device (power generating device)
3, 33, 51: brake rotor (rotating body)
7, 53: outer peripheral portion (first power generating element portion)
11, 21: coil (electromagnetic inductor)
12, 36, 56: conductor (electrical connection portion)
13: insulating body
14, 14A, 14B: friction portion (friction member, magnetic body, brake pad, second power generating element portion)
15: brush portion (electrical connection portion)
31: coil (electromagnetic inductor, second power generating element portion)
32A, 32B, 41A, 41B: friction portions (friction member, brake pad)
35A, 35B: fixing portion (second magnetic body, second power generating element portion)
38: outer peripheral portion (first magnetic body, first power generating element portion)
42A, 42B: electromagnetic coil (magnetic body, second power generating element portion)
45: magnetic flux density control driver (magnetic flux density controller)
52A, 52B: friction portions (friction member, brake pad, second power generating element portion)
G: central axis
X: vehicle

The invention claimed is:

1. A power generating device that is mounted on a vehicle and generates power by converting kinetic energy into electrical energy, the power generating device comprising:
  a rotating body that has a central axis and is rotated about the central axis;
  a friction member that comes into frictional contact with the rotating body;
  a first power generating element portion that is provided at the rotating body; and
  a second power generating element portion that is provided at the friction member,
  wherein the first and second power generating element portions generate power by using an electromagnetic induction phenomenon that is caused by an interaction between the first and second power generating element portions.

2. The power generating device according to claim 1, wherein the first power generating element portion includes a first magnetic body, and
the second power generating element portion includes a second magnetic body and an electromagnetic inductor that is adapted so as to be interposed between the first and second magnetic bodies.

3. The power generating device according to claim 1, wherein at least a part of the rotating body is covered with an insulating body.

4. The power generating device according to claim 1, wherein the rotating body and the first power generating element portion are manufactured by integral molding.

5. A braking device including the power generating device according to claim 1, wherein the rotating body is a brake rotor, and
the friction member is a brake pad.

6. The power generating device according to claim 1, wherein the first power generating element portion includes an electromagnetic inductor, and
the second power generating element portion includes magnetic bodies that are provided integrally with the friction member and are adapted so that the first power generating element portion is interposed between the magnetic bodies.

7. The power generating device according to claim 6, wherein the magnetic bodies are adapted so that the generation and stopping of magnetic forces of the magnetic bodies are controlled.

8. The power generating device according to claim 6, wherein the magnetic bodies are adapted so that magnetic flux densities of the magnetic bodies are changed by heat.

9. The power generating device according to claim 6, further comprising:
a magnetic flux density controller that controls the magnetic flux densities of the magnetic bodies.

10. The power generating device according to claim 6, further comprising:
electrical connection portions that are provided at the rotating body and the friction member, respectively, and control the opening and closing of a circuit including the electromagnetic inductor by controlling whether or not the electrical connection portions are electrically connected to each other.

11. A power generating device that is mounted on a vehicle and generates power by converting kinetic energy into electrical energy, the power generating device comprising:
a rotating body that has a central axis and is rotated about the central axis;
a friction member that comes into frictional contact with the rotating body;
a first power generating element portion that includes insulating body and is provided at the rotating body;
a second power generating element portion that includes insulating body and is provided at the friction member; and
a conductor and a brush portion that are electrically connected to each other,
wherein the first and second power generating element portions generate power by using an electrostatic phenomenon that occurs by the frictional contact between the first and second power generating element portions, and at the same time
the conductor and the brush portion are electrically connected to each other, so that an electrostatic circuit where current generated by the electrostatic phenomenon flows becomes a closed circuit.

\* \* \* \* \*